United States Patent [19]

Ozaki et al.

[11] Patent Number: 5,563,668
[45] Date of Patent: Oct. 8, 1996

[54] MOTION PICTURE FILM COMPOSITION METHOD

[75] Inventors: Yoshio Ozaki, Tokyo; John Galt, Kanagawa; Tomio Omata, Tokyo, all of Japan

[73] Assignee: Sony Corporation, Tokyo, Japan

[21] Appl. No.: 773,963

[22] PCT Filed: Mar. 13, 1991

[86] PCT No.: PCT/JP91/00342

§ 371 Date: Dec. 18, 1991

§ 102(e) Date: Dec. 18, 1991

[87] PCT Pub. No.: WO91/14337

PCT Pub. Date: Sep. 19, 1991

[51] Int. Cl.$^6$ .............................. A63J 5/00; G03B 19/18
[52] U.S. Cl. .................. 352/89; 352/45; 352/46; 352/129
[58] Field of Search ................... 352/46, 45, 89, 352/129, 85

[56] References Cited

U.S. PATENT DOCUMENTS 3,595,987  7/1971  Vlahos .

4,986,132  11/1990  Ferren ........................... 352/46

FOREIGN PATENT DOCUMENTS

2642599  3/1990  France .
787759  12/1957  United Kingdom .

*Primary Examiner*—Monroe H. Hayes
*Attorney, Agent, or Firm*—William S. Frommer; Alvin Sinderbrand

[57] ABSTRACT

A motion picture film composition method can be provided in which when a first motion picture film on which a first picture is imaged and a second motion picture on which a second picture is imaged are combined, the first motion picture film is converted into a video signal and processed in accordance with predetermined video signal processing to form an intermediate film and a mask film necessary for film composition, and a latent image obtained by superposing the intermediate film and the mask film and another latent image obtained by superposing the second picture film and the mask film are imaged for double exposure to combine the first motion picture film and the second motion picture film with high accuracy so that a combined motion picture film in which the second picture is superposed on the first picture can be made easily.

14 Claims, 10 Drawing Sheets

MOTION PICTURE FILM COMPOSITION METHOD

TECHNICAL FIELD

This invention relates to a motion picture film composition method, and is suitably applied to, for example, composition of a motion picture film on which a foreground picture is imaged and another motion picture film on which a background picture is imaged.

BACKGROUND ART

Conventionally, for filmmaking, a film composition method using an optical technique is used when a motion picture film on which a foreground picture of, for example, a piece of furniture is imaged separately (hereinafter referred to as "foreground film") is superimposed on another motion picture film on which a background picture of, for example, a landscape is imaged (hereinafter referred to as "background film").

In this method, a foreground film is first used to make a motion picture film consisting of a pattern covering the area other than the foreground (hereinafter referred to as "female mask film") by optical means.

Then this female mask film is optically reversed to make a motion picture film having a mask pattern covering the portion in a background film corresponding to the foreground of the foreground film (hereinafter referred to as "male mask film").

A latent image of the foreground alone obtained by superposing the foreground film and the female mask film and a latent image of the background including no part of the foreground obtained by superposing the background film and the male mask film are superimposed on a raw film.

The foreground film and the background film are optically combined in this manner to make a motion picture film in which the foreground picture is superposed on the background picture.

The film composition method using this optical technique requires a complicated process for making various mask films and intermediate films and optically combining these films.

It is difficult to preestimate the final result during intermediate processing for making mask films and intermediate films and, in fact, a highly expert technique is required to obtain a predicted result in a short time.

A film composition method is therefore used in which conventional motion picture films are converted, by telecinematography, into video signals in accordance with high-definition television (HDTV) signals to effect electrical image composition on the video signals, and composite video signals thereby obtained are recorded on a film by an electron beam picture recording apparatus to combine foreground and background films, thereby making a combined motion picture film in which a foreground picture is superimposed on a background picture.

Figure 9:
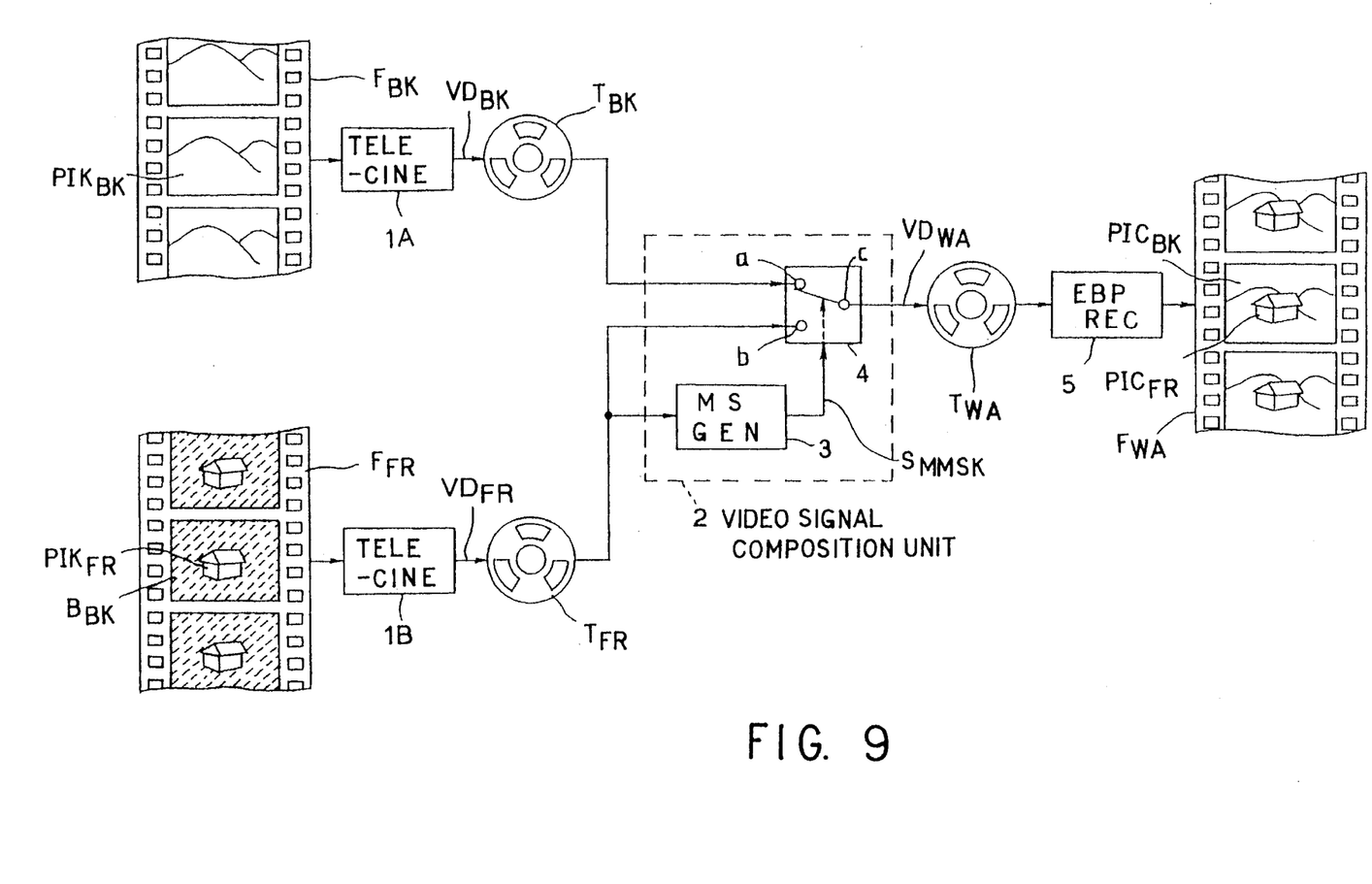
FIGS. 9 and 10 are schematic diagrams for explanation of the conventional motion picture composition method.

That is, as shown in FIG. 9, a background film $F_{BK}$ on which a background picture $PIC_{BK}$ is imaged is converted into a video signal through a telecinematographic unit 1A, thereby preparing a video tape $T_{BK}$ on which a background video signal $VD_{BK}$ is recorded.

Also, a foreground film $F_{FR}$ in which a foreground picture $PIC_{FR}$ is imaged on a so-called blue back $B_{BK}$ is converted into a video signal through a telecinematographic unit 1B, thereby preparing a video tape $T_{FR}$ on which a foreground video signal $VD_{FR}$ is recorded.

Video tapes $T_{BK}$ and $T_{FR}$ obtained in this manner are simultaneously played back by a video tape recorder (VTR), and a background video signal $VD_{BK}$ and a foreground video signal $VD_{FR}$ thereby obtained are input to a video signal composition unit 2 having a line-chromakey construction.

Video signal composition unit 2 is constituted by a mask signal generator 3 and a switching circuit 4. Background video signal $VD_{BK}$ and foreground video signal $VD_{FR}$ are supplied to first and second input terminals a and b of switching circuit 4.

Foreground video signal $VD_{FR}$ is also input to mask signal generator 3. Mask signal generator 3 then generates a male mask signal $S_{MMSK}$ for masking the area of foreground film $F_{FR}$ other than blue back $B_{BK}$ and supplies this signal to switching circuit 4 as a signal for changeover control of switching circuit 4.

Switching circuit 4 controls selection of the first or second input terminals a and b during one-line period of background video signal $VD_{BK}$ and foreground video signal $VD_{FR}$ in accordance with male mask signal $S_{MMSK}$, and a composite video signal $VD_{WA}$ thereby obtained through an output terminal c is recorded by a VTR to make a video tape $T_{WA}$.

Video tape $T_{WA}$ is played back at a low speed for electron beam picture recording by an electron beam picture recorder 5, and composite video signal $VD_{WA}$ is recorded on a raw film by electron beam picture recording.

Thus, background film $F_{FR}$ and foreground film $F_{BK}$ are combined to make a combined motion picture film $F_{WA}$ in which foreground picture $PIC_{FR}$ is superposed on background picture $PIC_{BK}$.

In a case where a combined motion picture film is made by using the video signal composition processing technique as described above, it is necessary to convert background film $F_{FR}$ and foreground film $F_{BK}$ into video signals $VD_{FR}$ and $VD_{BK}$, respectively.

There is therefore the problem of a deterioration of the image quality of the combined motion picture film $F_{WA}$ finally obtained relative to the qualities of the original motion picture films $F_{FR}$ and $F_{BK}$ due to limitation of the VTR band and other causes.

To solve this problem, a motion picture film composition method may be used in which only foreground film $F_{BK}$ obtained by imaging foreground picture $PIC_{FR}$ is converted into foreground video signal $VD_{FR}$ and the converted signal undergoes predetermined video signal processing, whereby advantages of film composition in terms of resolution and color development are maintained.

In this method, a mask signal is generated by a video signal composition technique using foreground video signal $VD_{FR}$ and is recorded on a film with an electron beam video recorder to facilitate mask film preparation most laborious and delicate in the film composition process.

Figure 10:
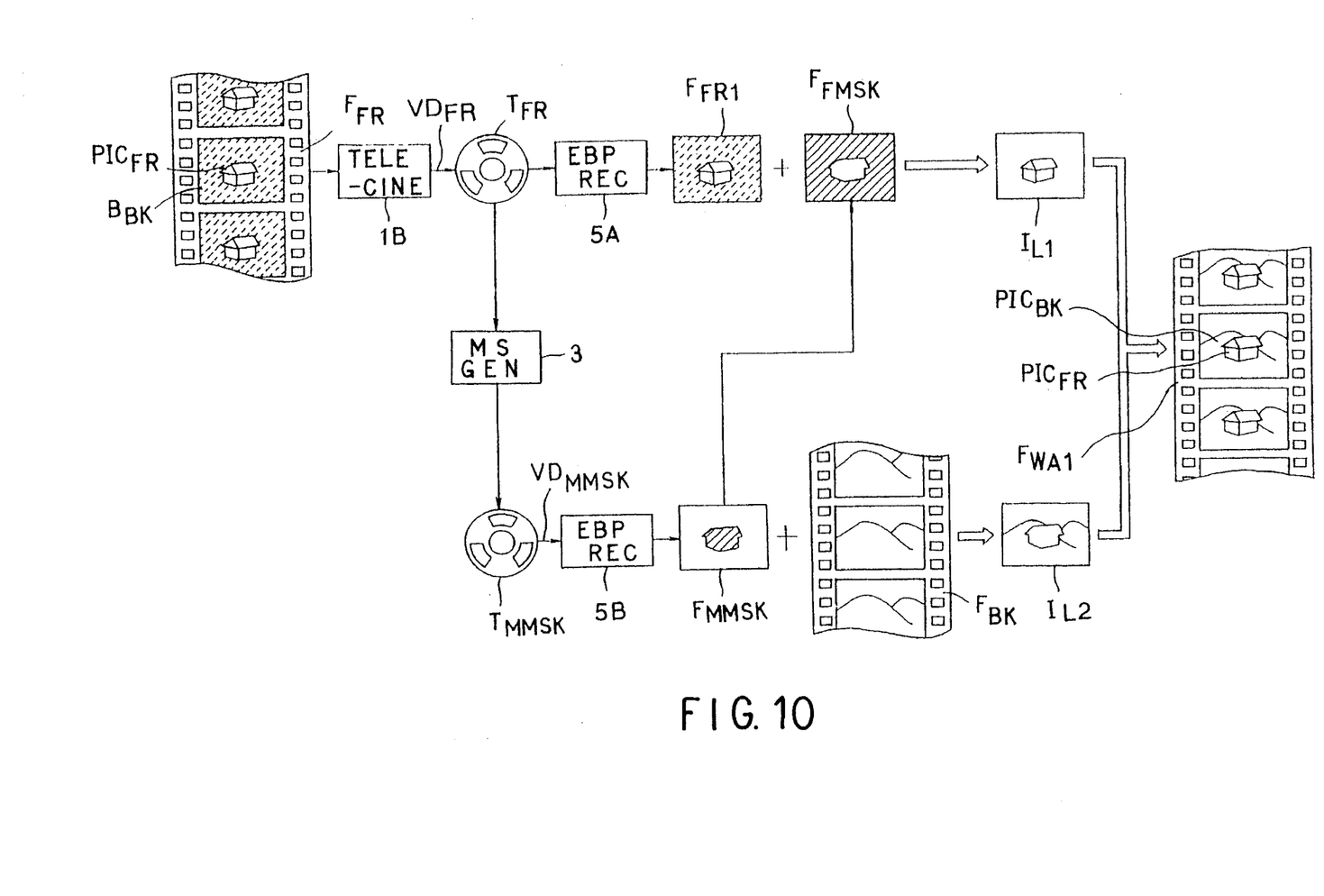

That is, as shown in FIG. 10 in which components corresponding to those of FIG. 9 are indicated by the same reference symbols, foreground film $F_{FR}$ is converted into a video signal by telecinematographic unit 1B, and foreground video signal $VD_{FR}$ thereby obtained is recorded by a VTR to make video tape $T_{FR}$.

This video tape $T_{FR}$ is played back at a low speed for electron beam picture recording by a first electron beam picture recorder 5A while being processed by reverse color composition, so that foreground video signal $VD_{FR}$ is recorded on a film by electron beam picture recording, thereby recording a second foreground film $F_{FR1}$ consisting of a positive image corresponding to foreground film $F_{FR}$.

Independently of this recording, video tape $T_{FR}$ is played back by a VTR and foreground video signal $VD_{FR}$ thereby obtained is input to mask signal generator 3 of video signal composition unit 2.

Mask signal generator 3 thereby generates male mask signal $S_{MMSK}$ masking the area of foreground film $F_{FR}$ other than blue back $B_{BK}$, and this signal is recorded by a VTR to make a video tape $T_{MMSK}$ on which a male mask video signal $VD_{MMSK}$ is recorded.

Video tape $T_{MMSK}$ is played back at a low speed for electron beam picture recording by a second electron beam picture recorder 5B while being processed by black-and-white composition, so that male mask video signal $VD_{MMSK}$ is recorded on a film by electron beam picture recording, thereby recording a male mask film $F_{MMSK}$.

A raw back-and-white film is exposed while superposing male mask film $F_{MMSK}$ on the raw film and is developed to form a female mask film $F_{FMSK}$ reversed from male mask film $F_{MMSK}$.

Thereafter, according to this film composition method, an optical printer constituted by a main projector and a film camera is used in such a manner that foreground film $F_{FR1}$ and female mask film $F_{FMSK}$ are set on the main projector by being superposed in a double superposition magazine called bi-pack, and a negative film in the film camera is exposed to the light image of these films.

Then, after the negative film in the film camera has been rewound, background film $F_{BK}$ and male mask film $F_{MMSK}$ are set on the main projector by a bi-pack, and the negative film in the film camera is exposed again to the light image of these films.

For this step, a so-called areal printer having two beam splitters may be used instead of the optical printer to perform exposure only one time for the same effect as the above operations.

In either case, a first latent image $I_{L1}$ obtained by superposing foreground film $F_{FR1}$ and female mask film $F_{FMSK}$ as described above and a second latent image $I_{L2}$ obtained by superposing background film $F_{BK}$ and male mask film $F_{MMSK}$ are combined and developed to combine background film $F_{BK}$ and foreground film $F_{FR}$, thereby making a combined motion picture film $F_{WA1}$ in which foreground picture $PIC_{FR}$ is superposed on background picture $PIC_{BK}$.

In the case of combined motion picture film $F_{WA1}$ thus obtained, in contrast with combined motion picture film $F_{WA}$ obtained by video signal composition processing of video signals $VD_{BK}$ and $VD_{FR}$ of background films $F_{BK}$ and foreground film $F_{FR}$ as described above, background film $F_{BK}$ can be converted into a final combined picture without any restriction due to limitation of the VTR band, and it is possible to make superposed motion picture film $F_{WA1}$ correspondingly improved in image quality, although a labor for making mask films $F_{MMSK}$ and $F_{FMSK}$ is required.

In the case of this motion picture film composition method, however, the timing of making second foreground film $F_{FR1}$ by electron beam picture recording and the timing of making male mask film $F_{MMSK}$ actually differs from each other, and the characteristics of the electron beam picture recorders therefore vary slightly, resulting in occurrence of an error in determining the picture position or size in combined motion picture film $F_{WA1}$ and, hence, failure to achieve a degree of film composition accuracy required for strict film superposition.

The characteristics of the electron beam picture recorders vary according to the increase in the temperature of the deflection yoke, drift of the deflection drive circuit, the difference between the vacuums of electron beam electrodes or other factors.

DISCLOSURE OF INVENTION

The present invention has been achieved in consideration of the above-described circumstances, and an object of the present invention is to provide a motion picture film composition method based on effecting video signal processing of a first motion picture film on which a first picture is imaged to make a film composition processing film, whereby the first motion picture film and a second motion picture film on which a second picture is imaged can be combined with high accuracy.

To achieve this object, according to the present invention, there is provided a method in which, when first motion picture film $F_{FR}$ on which a first picture $PIC_{FR}$ is imaged and a second motion picture film $F_{BK}$ on which a second picture $PIC_{BK}$ is imaged are combined, the first motion picture film $F_{FR}$ is converted into a video signal $VD_{FR}$, predetermined video signal processing is performed with respect to the video signal $VD_{FR}$ to make an intermediate film $F_{FR10}$ and mask films $F_{MMSK1}$, $F_{FMSK1}$, $F_{SMMSK1}$, and $F_{SFMSK1}$, a first latent image $I_{L10}$ obtained by superposing the second motion picture film $F_{BK}$ and the mask films $F_{MMSK1}$ and $F_{SMMSK1}$ is imaged to expose a predetermined raw film, a second latent image $I_{L11}$ obtained by superposing the intermediate film $F_{FR10}$ and the mask films $F_{FMSK1}$ and $F_{SFMSK1}$ is imaged to expose the same raw film, and the raw film is thereafter developed.

The first motion picture film $F_{FR}$ is converted into the video signal $VD_{FR}$ and is processed in accordance with predetermined video signal processing to make the intermediate film $F_{FR10}$ and the mask films $F_{MMSK1}$, $F_{FMSK1}$, $F_{SMMSK1}$, and $F_{SFMSK1}$, and the latent image $I_{L10}$ obtained by superposing the second motion picture film $F_{BK}$ and the mask films $F_{MMSK1}$ and the latent image $I_{L11}$ obtained by superposing the intermediate film $F_{FR10}$ and the mask films $F_{FMSK1}$ and $F_{SFMSK1}$ are imaged for double exposure, followed by development. The first motion picture film $F_{FR}$ and the second motion picture film $F_{BK}$ is thereby combined with high accuracy so that a combined motion picture film $F_{WA10}$ in which the second picture $PIC_{BK}$ is superposed on the first picture $PIC_{FR}$ can be formed easily.

BEST MODE FOR CARRYING OUT THE INVENTION

Embodiments of the present invention will be described below in detail with reference to the accompanying drawings.

(1) First Embodiment

Figure 1:
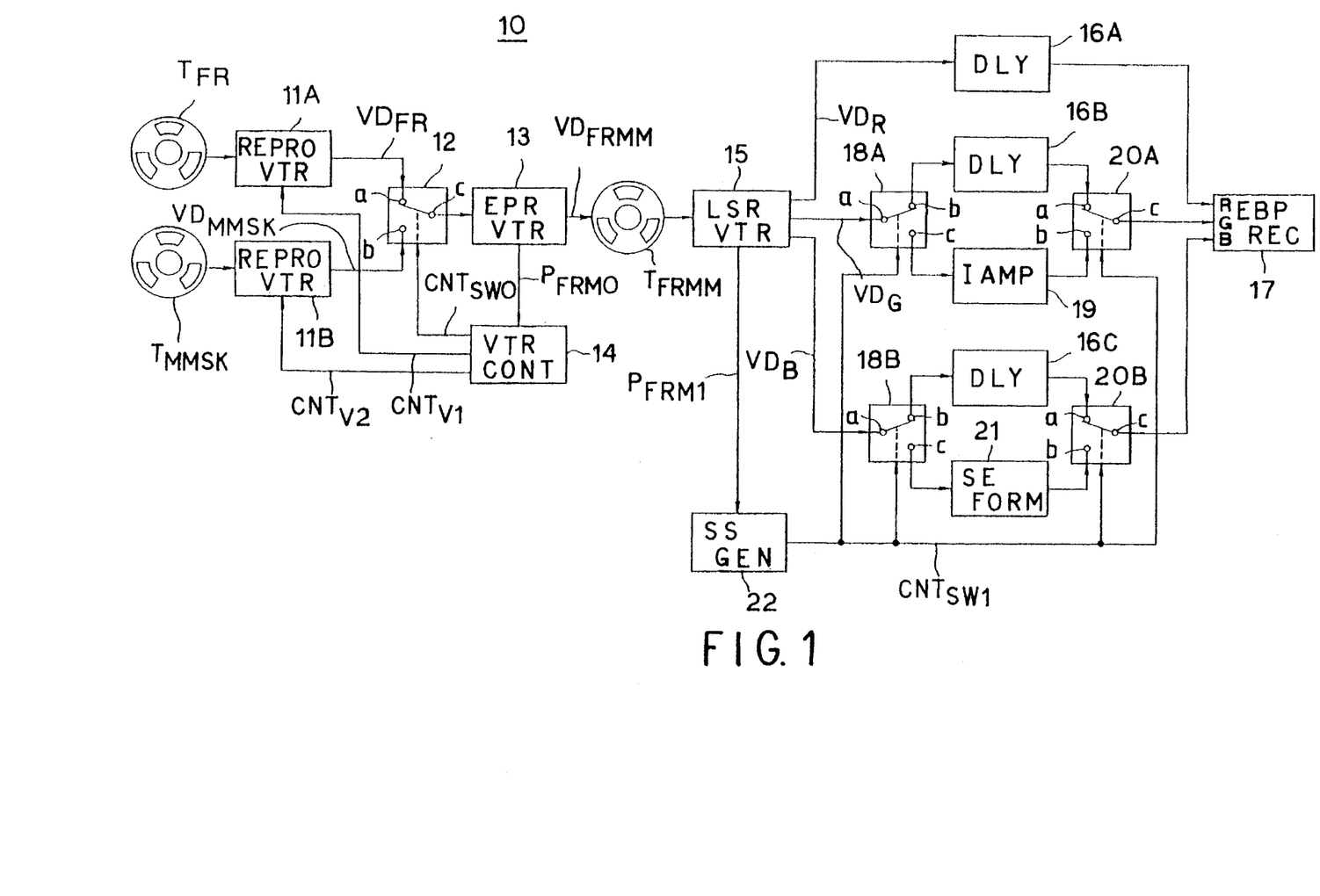
FIG. 1 is a block diagram of a first embodiment of a motion picture film composition method in accordance with the present invention.

Referring to FIG. 1 in which components corresponding to those shown in FIG. 10 are indicated by the same reference characters, the whole of a video signal processing apparatus for executing a motion picture film composition method in accordance with the first embodiment of the present invention is indicated by 10. A video tape $T_{FR}$ on which a foreground video signal $VD_{FR}$ is recorded is played back by a first reproducing VTR 11A, and a foreground video signal $VD_{FR}$ thereby obtained is supplied to an input terminal a of a switch circuit 12 and supplied to a VTR 13 for edition picture recording through an output terminal c of the switch 12.

Similarly, a video tape $T_{MMSK}$ on which a male mask signal $S_{MMSK}$ is recorded is played back by a second reproducing VTR 11B, and a foreground video signal $VD_{MMSK}$ thereby obtained is supplied to an input terminal b of the switch circuit 12 and supplied to the edition picture recording VTR 13 through the output terminal c.

Frame pulses $P_{FRMO}$ each generated in accordance with the timing of one frame of the video signals are sent from the edition picture recording VTR 13 to a VTR control circuit 14. The VTR control circuit 14 thereby sends to the first and second reproducing VTRs 11A and 11B VTR control signals $CNT_{V1}$ and $CNT_{V2}$ for alternatively performing the reproduction and stop operations of these VTRs every frame.

The VTR control circuit 14 also sends to the switch circuit 12 a switch changeover signal $CNT_{SWO}$ for selecting the input terminal a or b of the VTR 11A or 11B with respect to each frame during reproduction, thereby executing so-called AB roll editing of video signals output from the first and second reproducing VTRs 11A and 11B. A video tape $T_{FRMM}$ is thereby made on which is recorded a composition video signal such that foreground video signal $VD_{FR}$ and male mask video signal $VD_{MMSK}$ are alternatively repeated every frame.

Video tape $T_{FRMM}$ is played back by a low-speed reproduction VTR 15 for electron beam picture recording. Of video signals $VD_R$, $VD_G$ and $VD_B$ for three colors thereby obtained, a red video signal $VD_R$ is delayed by a first delayed circuit 16A to a predetermined extent and is supplied to a red input terminal R of an electron beam picture recording unit 17.

Also, a green video signal $VD_G$ is supplied to an input terminal a of a first switch circuit 18A. In first switch circuit 18A, a first or second output terminal b or c is selected according to control using a switch control signal $CNT_{SW1}$. The green video signal $VD_G$ is thereby input to a second delay circuit 16B or an inverting amplifier circuit 19, and each of output signals therefrom is supplied to a green input terminal G of the electron beam picture recording unit 17 through an output terminal c of a second switch circuit 20A which operates by being linked to the first switch circuit 18A to select a first or second input terminal a or b.

Further, a blue video signal $VD_B$ is supplied to an input terminal a of a third switch circuit 18B. In third switch circuit 18B, a first or second output terminal b or c is selected according to control using switch control signal $CNT_{SW1}$. The blue video signal $VD_B$ is thereby input to a third delay circuit 16C or a soft edge formation circuit 21, and each of output signals therefrom is supplied to a blue input terminal B of the electron beam picture recording unit 17 through an output terminal c of a fourth switch circuit 20B which operates by being linked to the third switch circuit 18B to select a first or second input terminal a or b.

Frame pulses $P_{FRM1}$ each generated in accordance with the timing of one frame of a low-speed reproduced video signal are supplied from the low-speed reproduction VTR 15 to a switch signal generation circuit 22.

The switch signal generation circuit 22 thereby outputs switch control signal $CNT_{SW1}$ having a value changed every third frame. The first output terminals b of the first and third switch circuits 18A and 18B and the first input terminals a of the second and fourth switch circuits 20A and 20B are thereby selected during the period of time for three frames in which three-color video signals $VD_R$, $VD_G$ and $VD_B$ corresponding to foreground video signal $VD_{FR}$ in composite video signal $VD_{FRMM}$ are output. Conversely, during the period of time for three frames in which three-color video signals $VD_R$, $VD_G$ and $VD_B$ corresponding to male mask video signal $VD_{MMSK}$ are output, the second output terminals c of the first and third switch circuits 18A and 18B and the second input terminals b of the second and fourth switch circuits 20A and 20B are thereby selected.

The delay circuits 16A to 16C have a delay time equal to the period of time for passage of video signals $VD_G$ and $VD_B$ through the inverting amplifier 19 and the soft edge formation circuit 21, thereby adjusting the times at which three-color video signals $VD_R$, $VD_G$ and $VD_B$ are respectively supplied to the red input terminal R, the green input terminal G and the blue input terminal B of the electron beam picture recording unit 17.

Thus, three-color video signals $VD_R$, $VD_G$, and $VD_B$ corresponding to foreground video signals $VD_{FR}$, male mask video signal $VD_{MMSK}$, female mask video signal $VD_{FMSK}$ obtained by reversing male mask video signal $VD_{MMSK}$, and soft male mask video signal $VD_{SMMSK}$ obtained by outline-softening male mask video signal $VD_{MMSK}$ are supplied successively and alternately to the red input terminal R, the green input terminal G and the blue input terminal B of the electron beam picture recording unit 17.

The electron beam picture recording unit 17 then records video signals $VD_R$, $VD_G$, $VD_B$, and $VD_{MMSK}$, $VD_{FMSK}$ and $VD_{SMMSK}$ supplied to the red input terminal R, the green input terminal G and the blue input terminal B on a black and white film, thereby forming a film $F_{10}$ for composition operation.

Figure 2:
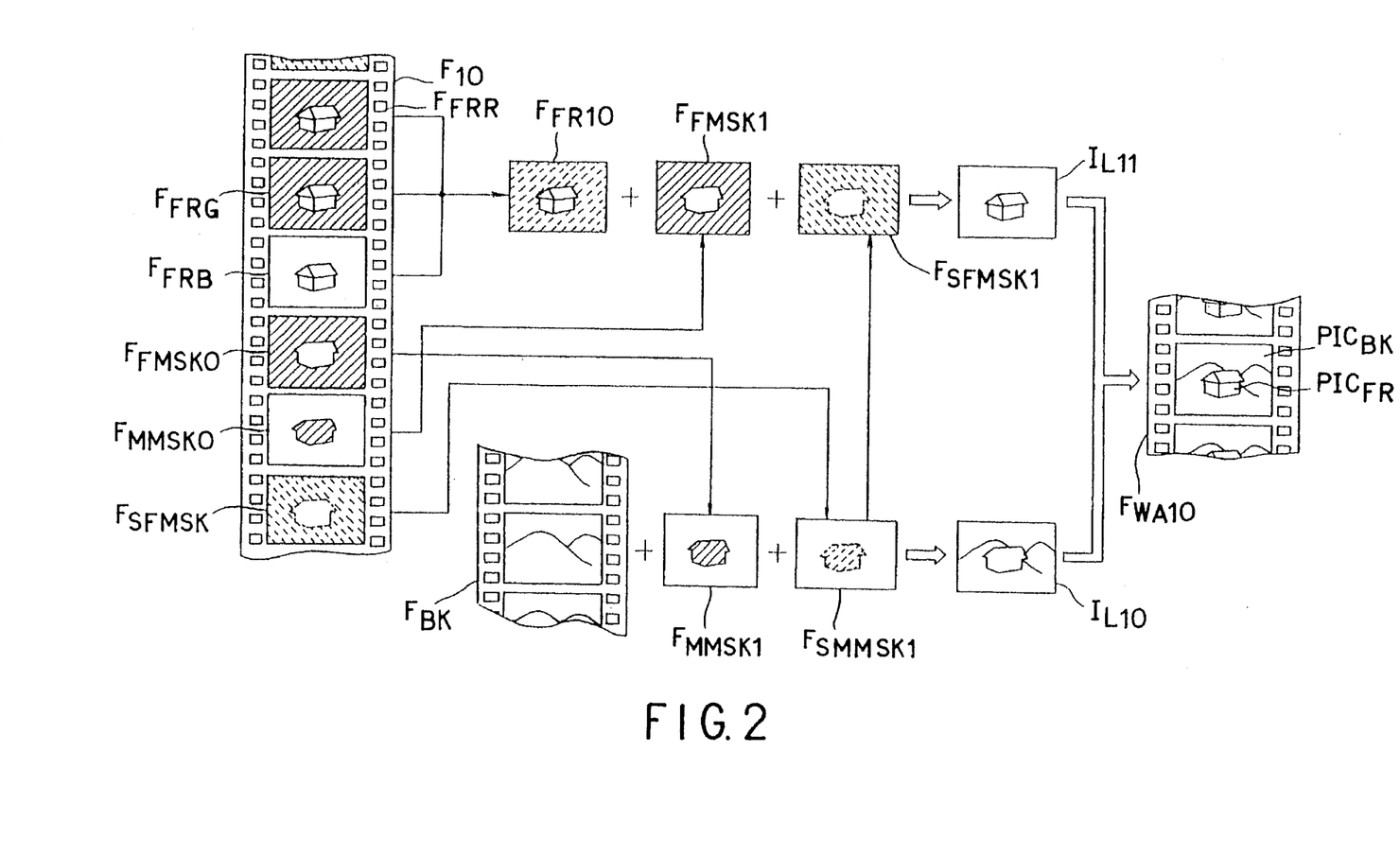
FIG. 2 is a schematic diagram for explanation of film composition processing of this method.

In practice, as shown in FIG. 2, black and white foreground films $F_{FRR}$, $F_{FRG}$, $F_{FRB}$, female mask film $F_{FMSKO}$, male mask film $F_{MMSK}$ and soft female mask film $F_{SFMSK}$ are successively recorded on composition operation film $F_{10}$ every six frames.

In the case of the motion picture film composition method in accordance with this embodiment, black and White foreground films $F_{FRR}$, $F_{FRG}$, $F_{FRB}$ in the thus-obtained composition operation film $F_{10}$ are combined to expose one frame of reversal color film through corresponding red, green and blue filters, thereby forming a foreground film $F_{FR10}$ having a positive image on a blue back.

Similarly, with respect to female mask film $F_{FMSK0}$, male mask film $F_{MMSK0}$ and soft female mask film $F_{SFMSK}$ of composition operation film $F_{10}$, the above-mentioned optical printer is operated in a six-frame skip mode to effect reversal printing of each film on a black and white film, thereby forming a male mask film $F_{MMSK1}$, a female mask film $F_{FMSK1}$ and a soft male mask film $F_{SMMSK1}$.

Further, this soft male mask film $FS_{MMSK1}$ is printed on a black and white film by contact printing to be black-and-white reversed, thereby forming a soft female mask film $F_{SFMSK1}$.

Then, according to this motion picture film composition method, background film $F_{BK}$ is set on a main projector, male mask film $F_{MMSK1}$ and soft male mask film $F_{SMMSK1}$ are superposed in a bi-pack to be set on an areal projector, and these films are imaged by a camera loaded with a color negative film to expose the same to form a latent image $I_{L10}$.

Thereafter, foreground film $F_{FR10}$ is set on the main projector, female mask film $F_{FMSK1}$ and soft female mask film $F_{SFMSK1}$ are superposed in a bi-pack to be set on the areal projector, and these films are imaged by the camera loaded with the color negative film exposed to have the latent image $I_{L11}$ and thereafter rewound.

A latent image $I_{L11}$ is thereby formed over the latent image $I_{L10}$ in a double exposure manner, and these images are developed to combine background film $F_{BK}$ and foreground film $F_{FR}$, thereby making a combined motion picture film $F_{WA10}$ in which foreground picture $PIC_{FR}$ is superposed on background picture $PIC_{BK}$.

In the thus-obtained combined motion picture film $FW_{A10}$, in contrast with combined motion picture film $F_{WA}$ described above with reference to FIG. 9, background film $F_{FR}$ can be converted into the final combined image without any restriction to VTR band limitation, and combined motion picture film $F_{WA10}$ correspondingly improved in image quality can be made, although a certain amount of labor is required to make mask films $F_{MMSK1}$ and $F_{FMSK1}$ and soft mask films $F_{SMMSK1}$ and $F_{SFMSK1}$.

In the combined motion picture film $F_{WA10}$, in contrast with combined motion picture film $F_{WA1}$ described above with reference to FIG. 10, black and white foreground films $F_{FRR}$, $F_{FRG}$, and $F_{FRB}$ from which foreground film $F_{FR10}$ is formed, female mask film $F_{FMSK0}$, male mask film $F_{MMSK0}$ and soft female mask film $F_{SFMSK}$ from which male mask film $F_{MMSK1}$, female mask film $F_{FMSK1}$ and soft male mask film $F_{SMMSK1}$ are formed can be recorded simultaneously on composition operation film $F_{10}$ by electron beam recording.

It is thereby possible to prevent the influence of changes in characteristics due to changes in electron beam recording unit 17 at the time of recording and, hence, to obtain combined motion picture film $F_{WA10}$ free from errors in image position and image size.

Further, in the case of combined motion picture film $F_{WA10}$, male mask video signal $VD_{MMSK}$ obtained from foreground video signal $VD_{FR}$ is video-signal-processed to form soft female mask video signal $VD_{SFMSK}$ which is recorded by electron beam recording to obtain soft mask films $F_{SMMSK1}$ and $F_{SFMSK1}$, thus making it easy to make a soft mask film which is very difficult to realize by optical means.

Since film composition processing is effected by using this film, if an unnatural portion exists at the boundary between background picture $PIC_{BK}$ and foreground picture $PIC_{FR}$, it can be removed effectively and a combined picture further improved in terms of naturalness can be obtained.

In accordance with the above-described method, foreground film $F_{FR}$ is processed telecinematographically to be converted into foreground video signal $VD_{FR}$, this foreground video signal $VD_{FR}$ and male mask video signal obtained from this are processed in accordance with predetermined video processing so that black and white foreground films $F_{FRR}$, $F_{FRG}$, and $F_{FRB}$ from which foreground film $F_{FR10}$ for film composition operation is formed, female mask film $F_{FMSKO}$, male mask film $F_{MMSK0}$ and soft female mask film $F_{SFMSK}$ from which male mask film $F_{MMSK1}$, female mask film $F_{FMSK1}$ and soft male mask film $F_{SMMSK1}$ are formed are recorded simultaneously by electron beam recording, and latent image $I_{L10}$ obtained by superposing background film $F_{FR}$, male mask film $F_{MMSK1}$ and soft male mask film $F_{SMMSK1}$ and latent image $I_{L11}$ obtained by superposing foreground film $F_{FR10}$, female mask film $F_{FMSK1}$ and soft female mask film $F_{SFMSK1}$ are imaged by double exposure. It is thereby possible to realize a motion picture film composition method which makes it possible to make combined motion picture film $F_{WA10}$ in which foreground picture $PIC_{FR}$ is superposed on background picture $PIC_{BK}$ by combining background film $F_{FR}$ and, foreground film $F_{BK}$ with high accuracy while effectively eliminating unnaturalness.

(2) Second Embodiment

Figure 3:
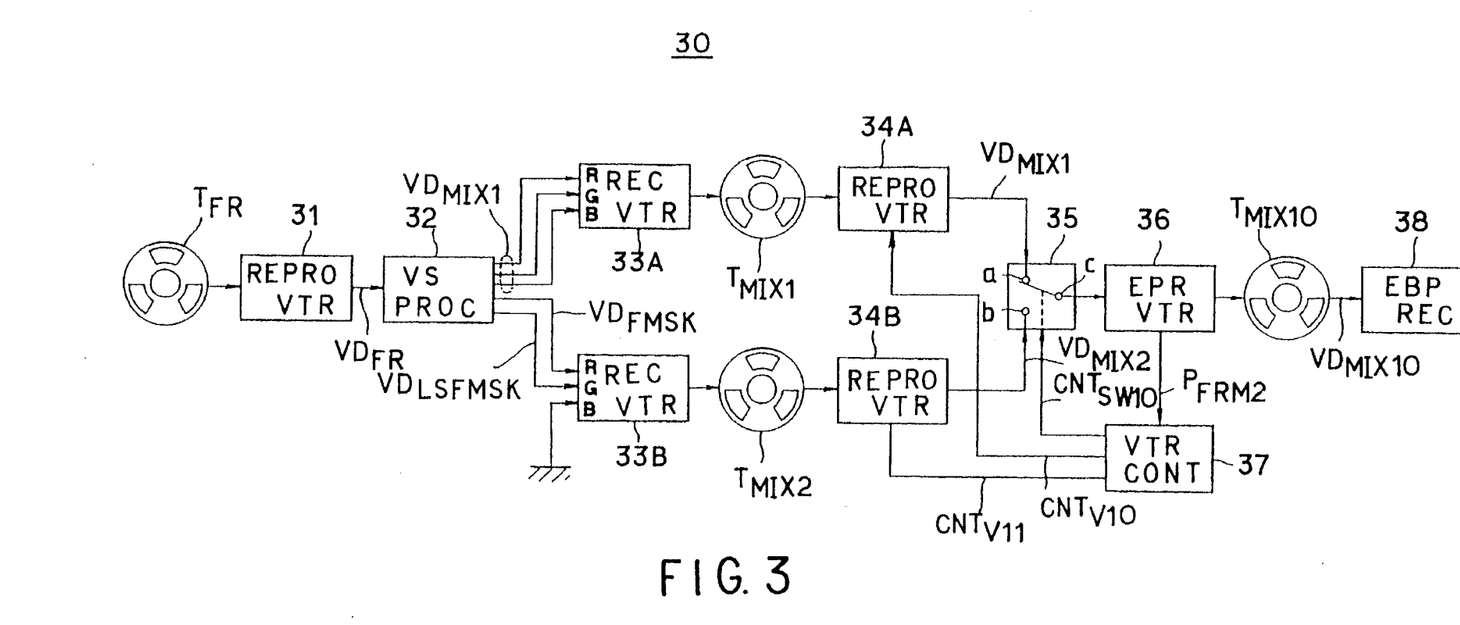
FIG. 3 is a block diagram of a second embodiment of the motion picture film composition method in accordance with the present invention.

Referring to FIG. 3 in which components corresponding to those shown in FIG. 1 are indicated by the same reference characters, the whole of a video signal processing apparatus for executing a motion picture film composition method in accordance with the second embodiment of the present invention is indicated by 30. A video tape $T_{FR}$ on which a foreground video signal $VD_{FR}$ is recorded is played back by a reproducing VTR 31, and a reproduction signal is input to a video signal processing circuit 32.

Video signal processing circuit 32 includes a chromakey and combines foreground video signal $VD_{FR}$ and female mask video signal $VD_{FMSK}$ formed by the chromakey with respect to each frame of foreground video signal $VD_{FR}$ to generate a first composite video signal $VD_{MIX1}$.

A red component, a green component and a blue component of first composite video signal $VD_{MIX1}$ are respectively supplied to corresponding terminals of a first picture recording VTR 33A, i.e., a red input terminal R, a green input terminal G and a blue input terminal B to form a video tape $T_{MIX1}$ on which first composite video signal $VD_{MIX1}$ is recorded.

Video signal processing circuit 32 generates female mask video signal $VD_{FMSK}$ and a low-contrast soft female mask video signal $VD_{LSFMSK}$ obtained by reducing the contrast of female mask video signal $VD_{FMSK}$ and edge-softening the same, and supplies these signals to a red input terminal R and a green input terminal G of a second picture recording VTR 33B, respectively.

A blue input terminal B of the second picture recording VTR 33B is always grounded to input black level. A video tape $T_{MIX2}$ is thereby formed on which is recorded a second composite video signal $VD_{MIX2}$ consisting of female mask video signal $VD_{FMSK}$, low-contrast soft female mask video signal $VD_{LSFMSK}$ and a black level video signal.

Video tapes $T_{MIX1}$ and $T_{MIX2}$ thus obtained are respectively played back by reproducing VTRs 34A and 34B. First and second composite video signals $VD_{MIX1}$ and $VD_{MIX2}$ thereby obtained are respectively supplied to first and second input terminals a and b of a switch circuit 35 and input to an edition picture recording VTR 36 through an output terminal c of the switch circuit 35.

Frame pulses $P_{FRM2}$ each generated in accordance with the timing of one frame of the video signals are sent from the edition picture recording VTR 36 to a VTR control circuit 37. The VTR control circuit 37 thereby sends to the first and second reproducing VTRs 34A and 34B VTR control signals $CNT_{V1}$ and $CNT_{V2}$ for alternatively performing the reproduction and stop operations of these VTRs every three frames.

The VTR control circuit 37 also sends to the switch circuit 35 a switch changeover signal $CNT_{SW10}$ for selecting the input terminal a or b of the VTR 34A or 34B every three frames during reproduction. The edition picture recording VTR 36 thereby executes so-called AB roll editing of video signals $VD_{MIX1}$ and $VD_{MIX2}$ output from the first and second reproducing VTRs 34A and 34B every three frames.

A video tape $T_{MIX10}$ is thereby made on which are recorded red, green and blue components of a composite video signal $VD_{MIX1}$ formed by combining foreground video signal $VD_{FR}$ and female mask video signal $VD_{FMSK}$ alternately every three frames, female mask video signal $VD_{FMSK}$, low-contrast soft female mask video signal $VD_{LSFMSK}$, and the black level video signal.

This video tape $T_{MIX10}$ is played back at a low speed by electron beam picture recording unit 38, and a composite video signal $VD_{MIX10}$ thereby obtained is recorded on a black and white film by electron beam recording, thereby forming a composition operation film $F_{20}$.

Figure 4:
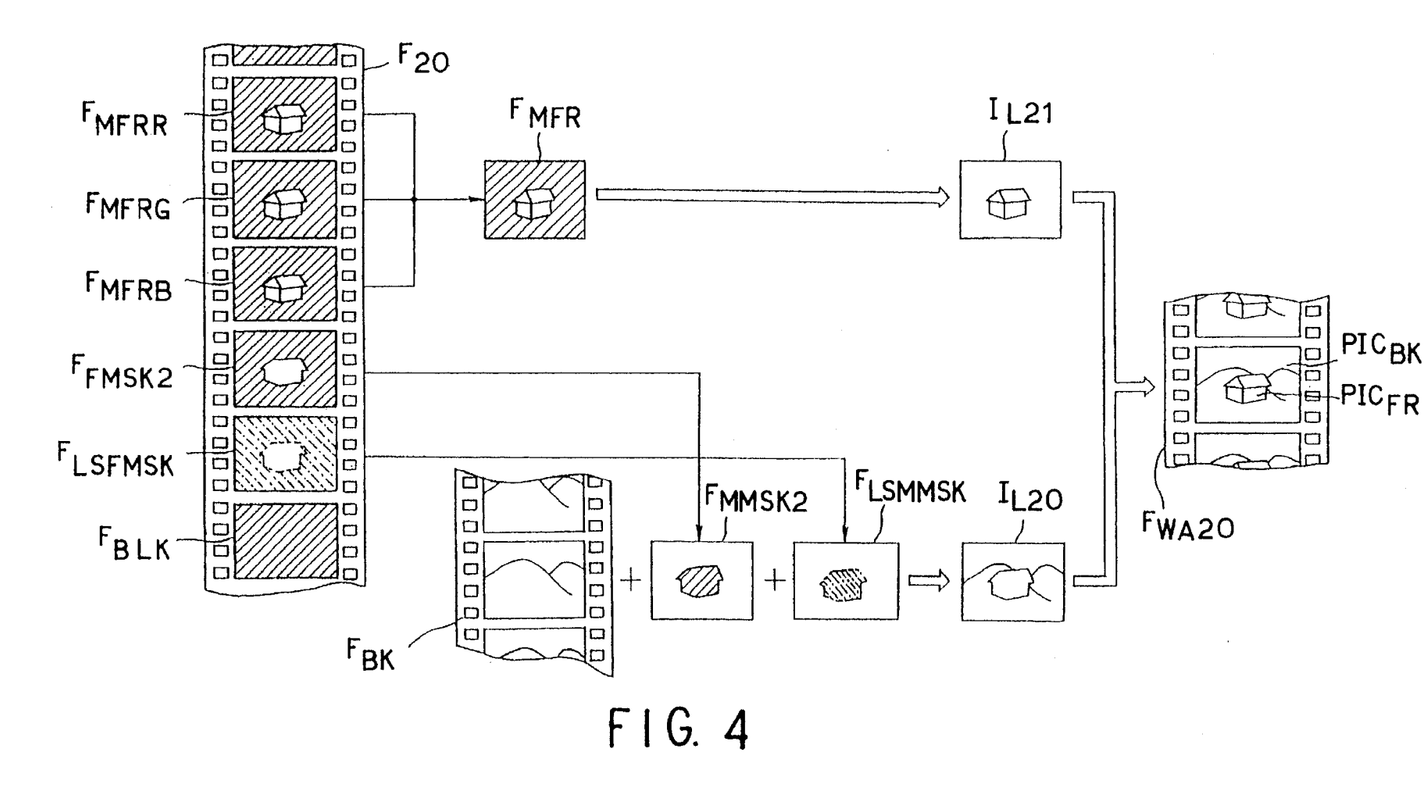
FIG. 4 is a schematic diagram for explanation of film composition processing of this method.

In practice, as shown in FIG. 4, black and white foreground films $F_{MFRR}$, $F_{MFRG}$, AND $F_{MFRB}$ corresponding to the red, green and blue components of first composite video signal $VD_{MIX1}$ formed by combining foreground video signal $VD_{FR}$ and female mask video signal $VD_{FMSK}$ made by the chromakey, a female mask film $F_{FMSK2}$, a low-contrast soft female mask film $F_{LSFMSK}$ and a black film $F_{BLK}$ corresponding to second composite video signal $VD_{MIX2}$ consisting of female mask video signal $VD_{FMSK2}$, low-contrast soft female mask video signal $VD_{LSFMSK}$ and black video signal are successively recorded on composition operation film $F_{20}$ every six frames.

In the case of the motion picture film composition method in accordance with this embodiment, black and white foreground films $F_{MFRR}$, $F_{MFRG}$, $F_{MFRB}$ in the thus-obtained composition operation film F20 are combined to expose one frame of reversal color film through corresponding red, green and blue filters, thereby forming a foreground film $F_{MFR}$ having a positive image in a male mask.

Similarly, with respect to female mask film $F_{FMSK2}$ and low-contrast soft female mask film $F_{LSFMSK}$ of composition operation film $F_{20}$, the above-mentioned optical printer is operated in a six-frame skip mode to effect reversal printing of each film on a black and white film, thereby forming a male mask film $F_{MMSK2}$ and a low-contrast soft male mask film $F_{LSMMSK}$.

Then, according to this motion picture film composition method, background film $F_{BK}$ is set on a main projector, male mask film $F_{MMSK2}$ and low-contrast soft male mask film $F_{LSMMSK}$ are superposed in a bi-pack to be set on an areal projector, and these films are imaged by a camera loaded with a color negative film to expose the same to form a latent image $I_{L20}$.

Thereafter, foreground film $F_{MFR}$ is set on the main projector and is imaged by the camera loaded with the color negative film exposed to have the latent image $I_{L20}$ and thereafter rewound. A latent image $I_{L21}$ is thereby formed over the latent image $I_{L20}$ in a double exposure manner, and these images are developed to combine background film $F_{FR}$ and foreground film $F_{BK}$, thereby making a combined motion picture film $F_{WA20}$ in which foreground picture $PIC_{FR}$ is superposed on background picture $PIC_{BK}$.

The thus-obtained combined motion picture film $F_{WA20}$ has generally the same image qualities as combined motion picture film $F_{WA10}$ described above with reference to FIGS. 1 and 2, and black and white foreground films $F_{MFRR}$, $F_{MFRG}$, and $F_{MFR}$ from which foreground film $F_{MFR10}$ for film composition operation is formed and female mask film $F_{FMSK2}$ and low-contrast soft female mask film $F_{LSMMSK}$ from which male mask film $F_{MMSK2}$ and low-contrast soft male mask film $F_{LSMMSK}$ are formed can be simultaneously recorded by electron beam recording. It is thereby possible to prevent the influence of changes in characteristics due to changes in electron beam recording unit 17 at the time of recording and, hence, to obtain combined motion picture film $F_{WA20}$ free from errors in image position and image size.

Further, in the case of combined motion picture film $F_{WA20}$, male mask video signal $VD_{MMSK}$ obtained from foreground video signal $VD_{FR}$ is video-signal-processed to form low-contrast soft female mask film $F_{LSFMSK}$ which is used for film composition processing. It is thereby possible to obtain combined motion picture film $F_{WA20}$ further improved in terms of naturalness by effectively removing unnatural portion existing at the boundary between background picture $PIC_{BK}$ and foreground picture $PIC_{FR}$.

In accordance with the above-described method, foreground film $F_{BK}$ is processed telecinematographically to be converted into a video signal, this foreground video signal $VD_{FR}$ and mask video signal $VD_{MMSK}$ obtained from foreground video signal $VD_{FR}$ are processed by predetermined video processing so that black and white foreground films $F_{MFRR}$, $F_{MFRG}$, and $F_{MFRB}$ from which foreground film $F_{MFR}$ for film composition operation is formed by composition on a female mask, and mask films $F_{FMSK}$ and $F_{LSFMSK}$ from which mask films $F_{MMSK3}$ and $F_{LSMMSK}$ for film composition operation are formed are recorded simultaneously by electron beam recording, and latent image $I_{L20}$ obtained by superposing background film $F_{FR}$, mask films $F_{MMSK2}$ and $F_{LSMMSK}$ and latent image $I_{L21}$ of foreground film $F_{MFR}$ are imaged by double exposure. It is thereby possible to realize a motion picture film composition method which makes it possible to make combined motion picture film $F_{WA20}$ in which foreground picture $PIC_{FR}$ is superposed on background picture $PIC_{BK}$ by combining background film $F_{FR}$ and foreground film $F_{BK}$ with high accuracy while effectively eliminating unnaturalness.

According to the above-described method, foreground film $F_{MFR}$ combined on a female mask by video-signal-processing foreground video signal $VD_{FR}$, and the step of preparing female mask film $F_{FMSK1}$ for film composition operation can therefore be removed, in contrast with the first embodiment.

(3) Third Embodiment

Figure 5:
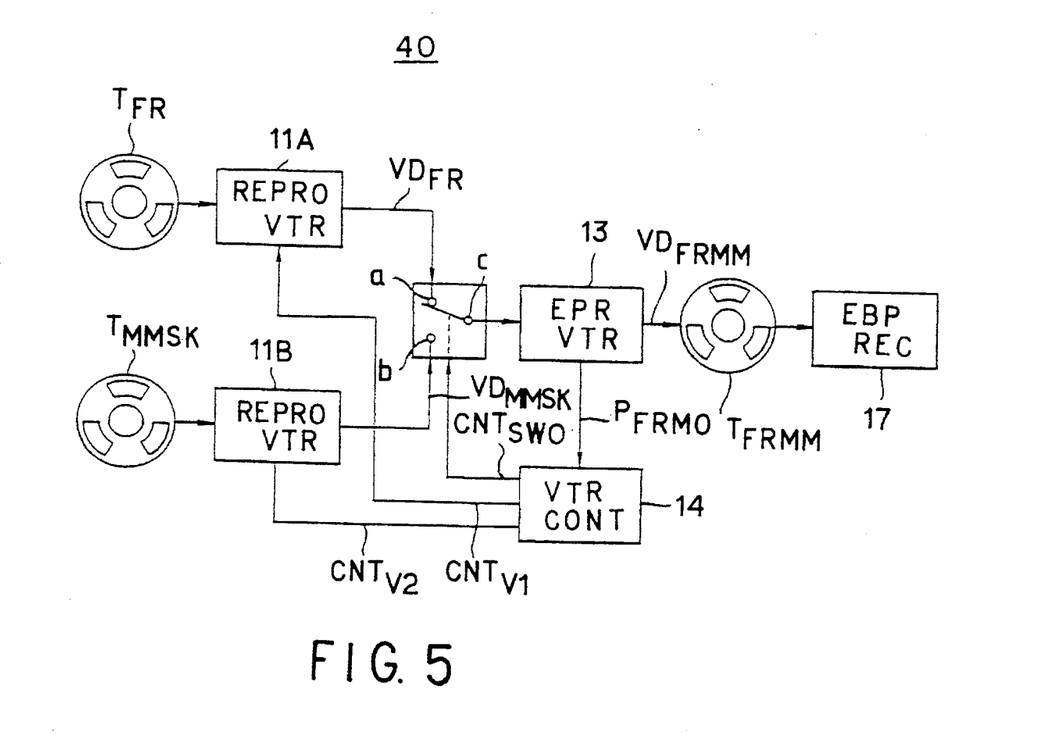
FIG. 5 is a block diagram of a third embodiment of the motion picture film composition method in accordance with the present invention.

Referring to FIG. 5 in which components corresponding to those shown in FIG. 1 are indicated by the same reference characters, the whole of a video signal processing apparatus for executing a motion picture film composition method in accordance with the third embodiment of the present invention is indicated by 40. This video signal processing apparatus is arranged for application to superposition of motion picture films $F_{BK}$ and $F_{FR}$ consisting of background picture $PIC_{BK}$ and foreground picture $PIC_{FR}$ such that occurrence of an unnatural portion at the boundary in the motion picture composition method in accordance with the first embodiment can be prevented.

That is, in this case, a video tape $T_{FRMM}$ on which a combined video signal $VD_{FRMM}$ in which foreground video signal $VD_{FR}$ and male mask video signal $VD_{MMSK}$ are alternately repeated every frame is recorded by edition picture recording VTR 13 is set in electron beam picture recording unit 17 to be played back at a low speed for electron beam picture recording and is recorded on three frames of black and white film with respect to each of its frame, thereby forming a first composition operation film $F_{30}$.

Figure 6:
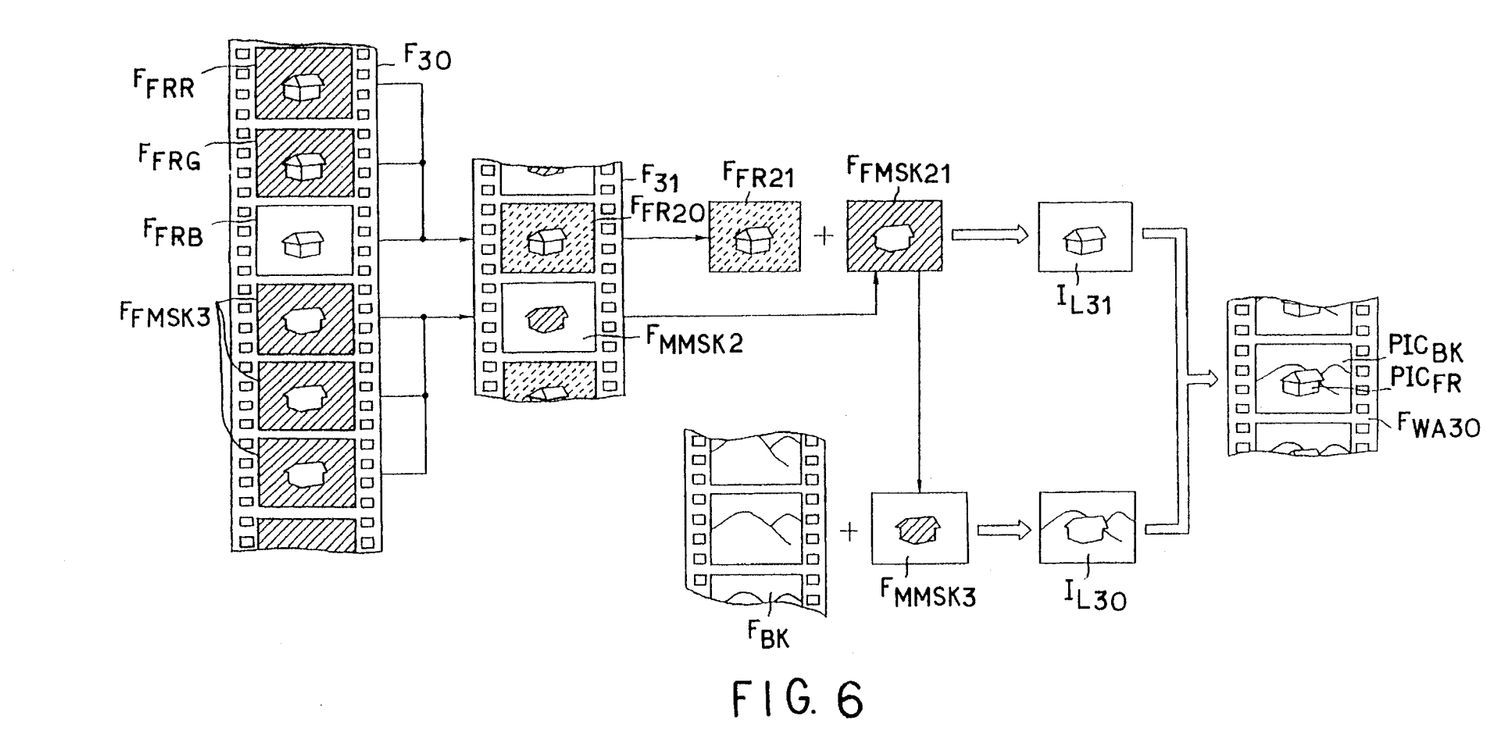
FIG. 6 is a schematic diagram for explanation of film composition processing of this method.

In practice, as shown in FIG. 6, black and white foreground films $F_{FRR}$, $F_{FRG}$, AND $F_{FRB}$ corresponding to red, green and blue components of foreground video signal $VD_{FR}$ and three frames of female mask film $F_{FMSK3}$ formed by reversing male mask video signal $VD_{MMSK}$ are successively recorded on first composition operation film $F_{30}$ every six films.

In the case of the motion picture film composition method in accordance with this embodiment, first composition operation film $F_{30}$ obtained in this manner is processed for color composition every three frames, black and white foreground films $F_{FRR}$, $F_{FRG}$, AND $F_{FRB}$ are thereby combined to expose one frame of reversal color film through corresponding red, green and blue filters to form a foreground film $F_{FR20}$ having a positive image on a blue back, and subsequent three frames of female mask film FFMSK3 are combined to expose one frame of reversal color film through the red, green and blue filters, thereby forming a male mask film $F_{MMSK2}$.

A second composition operation film $F_{31}$ is thereby formed on which foreground film $F_{FR10}$ and male mask film $F_{MMSK}$ are alternately recorded every frame.

With respect to fore ground film $F_{FR20}$ of the second composition operation film $F_{31}$, the optical printer is operated in a one-frame skip mode to effect composition exposure of a reversal color film, thereby forming a foreground film $F_{FR21}$ having a positive image on a blue back.

Similarly, with respect to male mask film $F_{MMSK2}$ of the second composition operation film $F_{31}$, the optical printer is operated in a one-frame skip mode to effect exposure of a black and white film, thereby forming a female mask film $F_{LSMMSK}$ reversed from male mask film $F_{MMSK2}$.

Further, this female mask film $F_{FMSMMSK}$ is printed on a black and white film by contact printing, thereby forming a male mask film $F_{MMSK3}$ black-and-white reversed from female mask film $F_{FMSK4}$.

Then, according to this motion picture film composition method, background film $F_{BK}$ and male mask film $F_{MMSK3}$ are superposed in a bi-pack to be set on an optical projector and are imaged by a camera loaded with a color negative film to expose the same to form a latent image $I_{L30}$.

Thereafter, foreground film $F_{FR21}$ and female mask film $F_{FMSK21}$ are superposed in a bi-pack to be set on the optical projector and are imaged by the camera loaded with the color negative film exposed to have the latent image $I_{L30}$ and thereafter rewound. A latent image $I_{L31}$ is thereby formed over the latent image $I_{L30}$ in a double exposure manner, and these images are developed to combine background film $F_{FR}$ and foreground film $F_{BK}$, thereby making a combined motion picture film $F_{WA30}$ in which foreground picture $PIC_{FR}$ is superposed on background picture $PIC_{BK}$.

According to the above-described method, no unnatural portion is formed at the boundary at the time of superposition of motion picture films and a film composition operation can be performed to combine background picture $PIC_{BK}$ and foreground picture $PIC_{FR}$ on a film without forming any soft mask. It is thus possible to realize a simpler motion picture composition method having such effects.

(4) Fourth Embodiment

Figure 7:
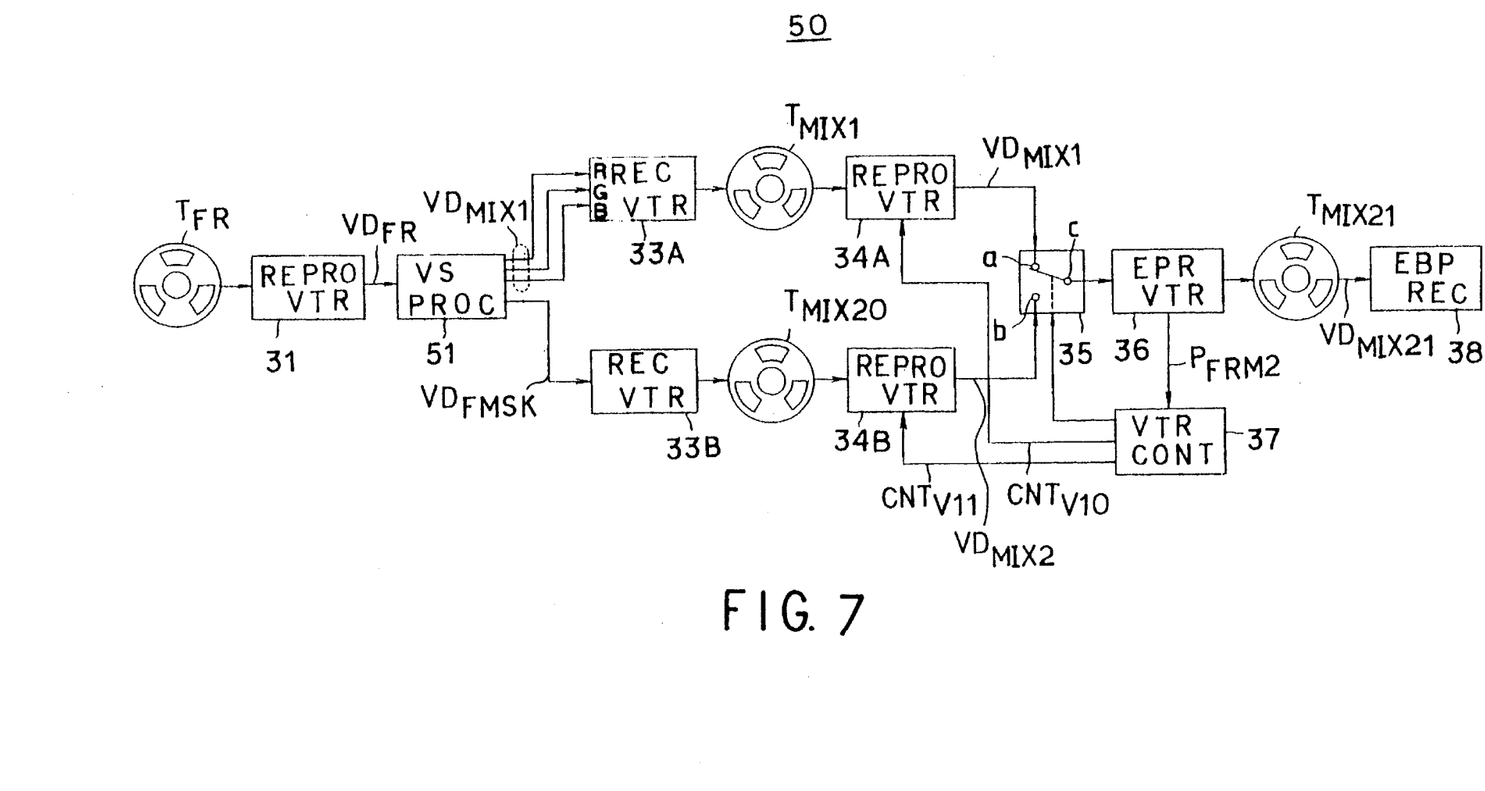
FIG. 7 is a block diagram of a fourth embodiment of the motion picture film composition method in accordance with the present invention.

Referring to FIG. 7 in which components corresponding to those shown in FIG. 3 are indicated by the same reference characters, the whole of a video signal processing apparatus for executing a motion picture film composition method in accordance with the fourth embodiment of the present invention is indicated by 50. This video signal processing apparatus is arranged for application to superposition of motion picture films $F_{BK}$ and $F_{FR}$ consisting of background picture $PIC_{BK}$ and foreground picture $PIC_{FR}$ such that occurrence of an unnatural portion at the boundary in the motion picture composition method in accordance with the second embodiment can be prevented.

In this case, a video tape $T_{FR}$ on which a foreground video signal $VD_{FR}$ is recorded is played back by a reproducing VTR 31, and a reproduction signal is input to a video signal processing circuit 51.

Video signal processing circuit 51 includes a chromakey and combines foreground video signal $VD_{FR}$ and female mask video signal $VD_{FMSK}$ formed by the chromakey with respect to each frame of foreground video signal $VD_{FR}$ to generate a first composite video signal $VD_{MIX1}$.

A red component, a green component and a blue component of first composite video signal $VD_{MIX1}$ are respectively supplied to corresponding terminals of a first picture recording VTR 33A, i.e., a red input terminal R, a green input terminal G and a blue input terminal B to form a video tape $T_{MIX1}$ on which first composite video signal $VD_{MIX1}$ is recorded.

In the case of this embodiment, female mask video signal $VD_{FMSK}$ is supplied from video signal processing circuit 51 to a second picture recording VTR 33B to form a video tape $T_{MIX20}$ on which female video signal $VD_{FMSK}$ for three frames is recorded.

Video tapes $T_{MIX1}$ and $T_{MIX2}$ thus obtained are respectively played back by reproducing VTRs 34A and 34B. First and second composite video signals $VD_{MIX1}$ and $VD_{MIX20}$ thereby obtained are respectively supplied to first and second input terminals a and b of a switch circuit 35 and input to an edition picture recording VTR 36 through an output terminal c of the switch circuit 35.

Frame pulses $P_{FRM2}$ each generated in accordance with the timing of one frame of the video signals are sent from the edition picture recording VTR 36 to a VTR control circuit 37. The VTR control circuit 37 thereby sends to the first and second reproducing VTRs 34A and 34B VTR control signals $CNT_{V10}$ and $CNT_{V11}$ for alternatively performing the reproduction and stop operations of these VTRs every three frames.

The VTR control circuit 37 also sends to the switch circuit 35 a switch changeover signal $CNT_{SW10}$ for selecting the input terminal a or b of the VTR 34A or 34B every three frames during reproduction. The edition picture recording VTR, 36 thereby executes so-called AB roll editing of video signals $VD_{MIX1}$ and $VD_{MIX20}$ output from the first and second reproducing VTRs 34A and 34B every three frames.

A video tape $T_{MIX21}$ is thereby made on which are recorded red, green and blue components of a composite video signal $VD_{MIX21}$ formed by combining foreground video signal $VD_{FR}$ and female mask video signal $VD_{FMSK}$ alternately every three frames, and female mask video signal $VD_{FMSK}$.

This video tape $T_{MIX21}$ is played back at a low speed by an electron beam picture recording unit 38, and a composite video signal $VD_{MIX21}$ thereby obtained is recorded on a black and white film by electron beam recording, thereby forming a composition operation film $F_{40}$.

Figure 8:
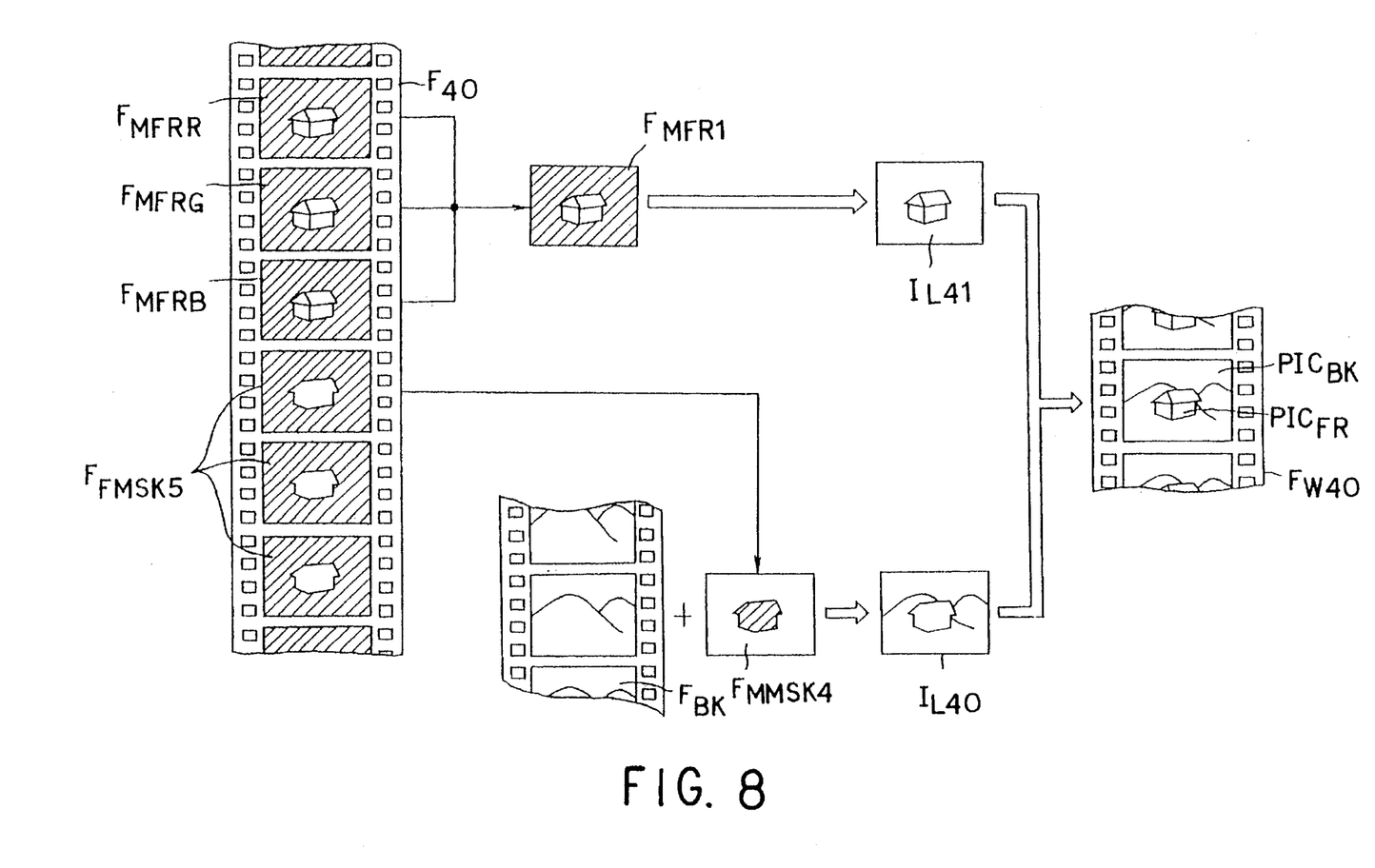
FIG. 8 is a schematic diagram for explanation of film composition processing of this method.

In practice, as shown in FIG. 8, black and white foreground films $F_{MFRR}$, $F_{MFRG}$, AND $F_{MFRB}$ corresponding to the red, green and blue components of first composite video signal $VD_{MIX21}$ formed by combining foreground video signal $VD_{FR}$ and female mask video signal $VD_{FMSK}$ made by the chromakey, three frames of female mask film $F_{FMSK5}$ are successively recorded on composition operation film $F_{40}$ every six films.

In the case of the motion picture film composition method in accordance with this embodiment, black and white foreground films $F_{MFRR}$, $F_{MFRG}$, $F_{MFRB}$ in the thus-obtained composition operation film $F_{40}$ are combined to expose one frame of reversal color film through corresponding red, green and blue filters, thereby forming a foreground film $F_{MFR1}$ having a positive image in a male mask.

Similarly, female mask film $F_{FMSK5}$ of composition operation film $F_{40}$ is printed on a black and white film to form a male mask film $F_{MMSK4}$.

Then, according to this motion picture film composition method, background film $F_{BK}$ and male mask film $F_{MMSK4}$ are superposed in a bi-pack to be set on an areal projector, and these films are imaged by a camera loaded with a color negative film to expose the same to form a latent image $I_{L40}$.

Thereafter, foreground film $F_{MFR1}$ is set on the main projector and is imaged by the camera loaded with the color negative film exposed to have the latent image $I_{L40}$ and thereafter rewound. A latent image $I_{L41}$ is thereby formed over the latent image $I_{L40}$ in a double exposure manner, and these images are developed to combine background film $F_{FR}$ and foreground film $F_{BK}$, thereby making a combined motion picture film $F_{WA40}$ in which foreground picture $PIC_{FR}$ is superposed on background picture $PIC_{BK}$.

According to the above-described method, no unnatural portion is formed at the boundary at the time of superposition of motion picture films and a film composition operation can be performed to combine background picture $PIC_{BK}$ and foreground picture $PIC_{FR}$ on a film without forming any, soft mask. It is thus possible to realize a simpler motion picture composition method having such effects.

(5) Fifth Embodiment (5-1) In the above-described embodiments, an optical printer and an areal printer having a bi-pack are employed as optical apparatuses for double printing or double exposure of mask films, picture motion films and the like. However, these apparatus are not exclusive in accordance with the present invention. Any other type of optical apparatuses can be used so long as double printing or double exposure can be performed as described above.

(5-2) In the above-described embodiments, an electron beam picture recording unit is used at the time of recording of a video signal on a motion picture film. However, this is not exclusive and any other recording unit such as a laser picture recording unit may be used to achieve the same effects as the above-described embodiments.

(5-3) In the above-described embodiments, a motion picture film on which foreground picture $PIC_{FR}$ is imaged is video-signal-processed. According to the present invention, the arrangement may alternatively be such that a motion picture film on which background picture $PIC_{BK}$ is imaged is video-signal-processed to make a mask film and an intermediate film, and a motion picture film on which foreground picture $PIC_{FR}$ is imaged and another motion picture film on which background picture $PIC_{BK}$ is imaged are thereby combined on a film, thereby achieving the same effects as the above-described embodiments.

(5-4) In the above-described embodiments, a motion picture film on which foreground and background pictures are imaged is composed, but the present invention is not limited to this. The present invention can be suitably applied to various cases of combining a motion picture film on which a first picture is imaged and anther motion picture on which a second picture is imaged.

Explanation of Symbols 1A, 1B ... telecinematographic units; 2 ... video signal composition unit; 5, 5A, 5B, 17, 38 ... electron beam picture recording units; 10, 30, 40, 50 ... video signal processing units; 11A, 11B, 31, 34A, 35B ... reproducing VTRs; 13, 36 ... Edition picture recording VTRs; 33A, 33B ... picture recording VTRs; 15 ... low speed reproduction VTR; 32, 51 ... video signal processing circuit.

What is claimed is:

1. A motion picture film composition method for combining first pictures imaged on a first motion picture film with respective ones of second pictures imaged on a second motion picture film, said method comprising the steps of:

(a) converting said first pictures from said first motion picture film into a first video signal;

(b) forming a mask signal corresponding with said first video signal;

(c) alternately processing said first video signal and said mask signal telecinematographically to form respective picture frames on a third motion picture film from said first video signal and from said mask signal, respectively;

(d) exposing a plurality of first latent images on a fourth motion picture film, said plurality of first latent images being obtained from said second motion picture film, as such, and from images in the picture frames of said third motion picture film which are formed from said mask signal corresponding with said first video signal;

(e) exposing a plurality of second latent images on said fourth motion picture film, said plurality of second latent images being obtained from images in the picture frames of said third motion picture film which are formed from said first video signal; and (f) developing said fourth motion picture film.

2. The motion picture film composition method of claim 1, wherein said step of alternately processing said first video signal and said mask signal comprises producing red, green and blue foreground video signals from said first video signal, and recording said red, green and blue foreground video signals in successive frames on a black and white film to form a red-black and white foreground frame, a green-black and white foreground frame and a blue-black and white foreground frame, wherein the step of forming a mask signal comprises forming a male mask video signal corresponding with said first video signal, and wherein the step of alternately processing said first video signal and said mask signal further comprises inverting said male mask video signal to produce a female mask video signal, outline softening said male mask video signal to produce an edge-softened male mask video signal, and recording said male mask video signal, said female mask video signal, and said edge-softened male mask video signal in successive frames on said black and white film to form a female mask frame, a male mask frame and a soft female mask frame.

3. The motion picture film composition method of claim 1, wherein said step of alternately processing said first video signal and said mask signal comprises producing red, green and blue foreground video signals from red, green and blue components of a foreground image of said first video signal, respectively, and recording said red, green and blue foreground video signals in successive frames on a black and white film to form a red-black and white foreground frame, a green-black and white foreground frame and a blue-black and white foreground frame, wherein the step of forming a mask signal comprises forming a female mask video signal corresponding with said first video signal by a chroma key process, and wherein the step of alternately processing said first video signal and said mask signal further comprises low-contrast processing and line-softening said female mask video signal to produce a low-contrast and line-softened female mask video signal, forming a black level video signal, and recording said female mask video signal, said low-contrast and line-softened female mask video signal and said black level video signal in successive frames on said black and white film to form a female mask frame, a low-contrast and line-softened female mask frame and a black frame.

4. The motion picture film composition method of claim 1, wherein said step of alternately processing said first video signal and said mask signal comprises producing red, green and blue foreground video signals from said first video signal, and recording said red, green and blue foreground video signals in successive frames on a black and white film to form a red-black and white foreground frame, a green-black and white foreground frame and a blue-black and white foreground frame, wherein the step of forming a mask signal comprises forming a male mask video signal corresponding with said first video signal, and wherein said step of alternately processing said first video signal and said mask signal further comprises inverting said male mask video signal to form a female mask video signal, recording said female mask video signal in three successive frames on said black and white film to form three successive female mask frames thereon, exposing each of the red, green and blue-black and white foreground frames through respective red, green and blue filters on a first single frame of an inverse color film, and exposing each of the three successive female mask frames through respective red, green and blue filters on a second single frame of said inverse color film.

5. The motion picture film composition method of claim 4, wherein said steps of exposing the red, green and blue-black and white foreground frames and each of the three successive female mask frames on said inverse color film comprise exposing plural groups of said red, green and blue-black and white foreground frames and successive female mask frames to form alternating first and second single frames on said inverse color film.

6. The motion picture film composition method of claim 1, wherein said step of alternately processing said first video signal and said mask signal comprises producing red, green and blue foreground video signals from red, green and blue components of a foreground image of said first video signal, respectively, and recording said red, green and blue foreground video signals in successive frames on a black and white film to form a red-black and white foreground frame, a green-black and white foreground frame and a blue-black and white foreground frame, wherein the step of forming said mask signal comprises forming a female mask video signal corresponding with said first video signal by a chroma key process, and wherein the step of alternately processing said first video signal and said mask signal further comprises recording said female mask video signal in at least one frame of said black and white film to form a female mask frame.

7. The motion picture film composition method of claim 1, wherein the steps of exposing a plurality of second latent images on said fourth motion picture film comprises obtaining said second latent images from images in said picture frames formed from said first video signal and said mask signal on said third motion picture film.

8. A motion picture film composition apparatus for combining first pictures imaged on a first motion picture film with respective ones of second pictures imaged on a second motion picture film, said motion picture film composition apparatus comprising:

converting means for converting the first pictures from the first motion picture film into a first video signal;

mask signal forming means for forming a mask signal corresponding with said first video signal;

motion picture film production means for alternately processing said first video signal and said mask signal telecinematographically to form respective picture frames on a third motion picture film from said first video signal and from said mask signal, respectively;

first means for exposing a plurality of first latent images on a fourth motion picture film, said plurality of first latent images being obtained from said second motion picture film, as such, and from images in the picture frames of said third motion picture film which are formed from said mask signal corresponding with said first video signal;

second means for exposing a plurality of second latent images on said fourth motion picture film, said plurality of second latent images being obtained from images in the picture frames of said third motion picture film which are formed from said first video signal; and means for developing said fourth motion picture film.

9. The motion picture film composition apparatus of claim 8, wherein said motion picture film production means is operative to produce red, green and blue foreground video signals from said first video signal, and to record said red, green and blue foreground video signals in successive frames on a black and white film to form a red-black and white foreground frame, a green-black and white foreground frame and a blue-black and white foreground frame, said mask signal forming means is operative to form a male mask video signal corresponding with said first video signal, and said motion picture film production means is further operative to invert said male mask video signal to produce a female mask video signal, to outline soften said male mask video signal to produce an edge-softened male mask video signal, and to record said male mask video signal, said female mask video signal, and said edge-softened male mask video signal in successive frames on said black and white film to form a female mask frame, a male mask frame and a soft female mask frame.

10. The motion picture film composition apparatus of claim 8, wherein said motion picture film production means is operative to produce red, green and blue foreground video signals from red, green and blue components of a foreground image of said first video signal, respectively, and to record said red, green and blue foreground video signals in successive frames on a black and white film to form a red-black and white foreground frame, a green-black and white foreground frame and a blue-black and white foreground frame, said mask signal forming means is operative to form a female mask video signal corresponding with said first video signal by a chroma key process, and said motion picture film production means is further operative to low-contrast process and line-soften said female mask video signal to produce a low-contrast and line-softened female mask video signal, to form a black level video signal, and to record said female mask video signal, said low-contrast and line-softened female mask video signal and said black level video signal in successive frames on said black and white film to form a female mask frame, a low-contrast and line-softened female mask frame and a black frame.

11. The motion picture film composition apparatus of claim 8, wherein said motion picture film production means is operative to produce red, green and blue foreground video signals from said first video signal, and to record said red, green and blue foreground video signals in successive frames on a black and white film to form a red-black and white foreground frame, a green-black and white foreground frame and a blue-black and white foreground frame, said mask signal forming means is operative to form a male mask video signal corresponding with said first video signal, and said motion picture film production means is further operative to invert said male mask video signal to form a female mask video signal, to record said female mask video signal in three successive frames on said black and white film to form three successive female mask frames thereon, to expose each of the red, green and blue-black and white foreground frames through respective red, green and blue filters on a first single frame of an inverse color film, and to expose each of the three successive female mask frames through respective red, green and blue filters on a second single frame of said inverse color film.

12. The motion picture film composition apparatus of claim 11, wherein said motion picture film production means is operative to expose plural groups of said red, green and blue-black and white foreground frames and said successive female mask frames in alternate first and second single frames of said inverse color film.

13. The motion picture film composition apparatus of claim 8, wherein said motion picture film production means is operative to produce red, green and blue foreground video signals from red, green and blue components of a foreground image of said first video signal, respectively, and to record said red, green and blue foreground video signals in successive frames on a black and white film to form a red-black and white foreground frame, a green-black and white foreground frame and blue-black and white foreground frame, the mask signal forming means is operative to form a female mask video signal corresponding with said first video signal by a chroma key process, and said motion picture film production means is operative to record said female mask video signal in at least one frame of said black and white film to form a female mask frame.

14. The motion picture film composition apparatus of claim 8, wherein the second means is operative to expose said plurality of second latent images on said fourth motion picture film such that said plurality of second latent images are obtained from images in said picture frames formed from said first video signal and said mask signal on said third motion picture film.

\* \* \* \* \*